(12) United States Patent
Plociennik et al.

(10) Patent No.: US 8,700,197 B2
(45) Date of Patent: Apr. 15, 2014

(54) ROBOT INTERACTION SYSTEM

(75) Inventors: Christian Plociennik, Ratingen (DE);
Hans-Wilhelm Schöck, Duisburg (DE);
Mark Moors, Düsseldorf (DE)

(73) Assignee: SMS Siemag Aktiengesellschaft,
Düsseldorf (DE)

( * ) Notice: Subject to any disclaimer, the term of this patent is extended or adjusted under 35 U.S.C. 154(b) by 440 days.

(21) Appl. No.: 13/126,893

(22) PCT Filed: Oct. 29, 2009

(86) PCT No.: PCT/EP2009/007765
§ 371 (c)(1),
(2), (4) Date: Aug. 17, 2011

(87) PCT Pub. No.: WO2010/063349
PCT Pub. Date: Jun. 10, 2010

(65) Prior Publication Data
US 2011/0295399 A1    Dec. 1, 2011

(30) Foreign Application Priority Data

| Oct. 29, 2008 | (DE) | 10 2008 053 699 |
| Feb. 4, 2009 | (DE) | 10 2009 007 540 |
| Oct. 21, 2009 | (DE) | 10 2009 050 249 |

(51) Int. Cl.
*G06F 19/00*    (2011.01)
*G05B 19/00*    (2006.01)

(52) U.S. Cl.
USPC ............. 700/97; 700/245; 700/250; 700/251

(58) Field of Classification Search
USPC ............ 700/97, 245, 250, 251, 252; 901/1, 2, 901/46
See application file for complete search history.

(56) References Cited

U.S. PATENT DOCUMENTS

| 5,037,672 A | 8/1991 | Daussan et al. |
| 6,073,678 A | 6/2000 | Garza-Ondarza et al. |
| 6,805,190 B2 | 10/2004 | Hamilton et al. |

FOREIGN PATENT DOCUMENTS

| DE | 102005003827 Y | 7/2006 |
| DE | 102005011143 Y | 9/2006 |
| EP | 1635107 Y | 3/2006 |
| JP | 07016739 Y | 1/1995 |
| JP | 2006043861 Y | 2/2006 |
| KR | 20030001661 Y | 1/2003 |
| KR | 20030016127 Y | 2/2003 |
| WO | 2005118182 | 12/2005 |
| WO | 2007057061 | 5/2007 |
| WO | 2008025562 | 3/2008 |

*Primary Examiner* — Ian Jen
(74) *Attorney, Agent, or Firm* — Lucas & Mercanti, LLP; Klaus P. Stoffel

(57) ABSTRACT

In the case of a robot interaction system comprising a robot (1) having a robot controller with types of operation and operating modes which influence an associated man-robot interface, the aim is to provide a solution which allows flexible matching of a robot or robot system to different degrees of a man-robot interaction. This is achieved in that the robot controller is equipped with types of operation and operating modes which influence an associated man-robot interface and are designed to be matched and/or to be capable of being matched to different automation degrees of the robot (1) and/or to different time and/or physical positions of the man and robot as interaction partners in a working area.

14 Claims, 2 Drawing Sheets

ROBOT INTERACTION SYSTEM

The present application is a 371 of International application PCT/EP2009/007765 filed Oct. 29, 2009, which claims priority of DE 10 2008 053 699.7, filed Oct. 29, 2008, DE 10 2009 007 540.2, filed Feb. 4, 2009, and DE 10 2009 050 249.1, filed Oct. 21, 2009, the priority of these applications is hereby claimed and these applications are incorporated herein by reference.

BACKGROUND OF THE INVENTION

The invention pertains to a robot interaction system comprising a robot with a robot control unit provided with types and modes of operation which influence an assigned human-robot interface.

It is known from the prior art that metallurgical and/or roiling plants can be equipped with manipulators or robots, especially industrial robots. Manipulators for connecting a ladle shroud to a tundish, for example, or for transporting heavy bricks during the work of lining a converter have existed for a long time. Fully automated robots are also used to lacquer coils or to spray-coat an electric-arc furnace. Common to most of these applications is that the robot in question is adapted to only one task and is designed specifically for it.

From WO 2005/118182 A1, furthermore, the use of multifunction robots, i.e., those which execute more than one task, is known, wherein, according to this prior art, the robot system is designed in such a way that it can perform several different activities on a casting platform. A robot system which comprises a multifunction robot which maintains the bottom of a ladle in a ladle maintenance stand is known from WO 2008/025562 A1.

Although the robots known from the prior art, especially the multifunction robots, can perform different tasks, their functionality is usually directed at fully automated use.

Alternatively, the human being in his function as employee or worker can at best intervene in the work activity of the multifunction robot by making use of its remote-controlled manipulation operating mode. During the activity and in the operating state of the multifunction robot, the area in which robot works and moves must remain separate at all times from that of the worker, so that the robot will not endanger the human being. To ensure the satisfactory functionality of the robot in question, however, fully automated solutions demand a certain measure of necessary sensory or detection capacity, dexterity, and/or decision-making ability to execute a work process successfully. In the case of complicated work procedures, therefore, such systems soon reach their limits with respect to the costs necessary for their realization, with respect to the stability of the system, and with respect to the safety of the process. Precisely in metallurgical and rolling plants, however, it is often necessary during the course of certain manual jobs for the human being, that is, the worker or employee working in the area in question, to make a well-founded and rapid decision concerning what is to be done next on the basis of his immediate observations. Thus, in the case of maintenance work on a casting ladle, decisions must be made about which parts can continue to be used and which ones must be replaced. This means that the actual situation must be correctly determined, but it also requires a certain measure of decision-making ability so that the correct decision can be made for the case at hand. According to the solutions known so far from the prior art, the industrial robots will in such cases be moved aside or immobilized or locked down, and a worker will then enter the area where the robot moves and works, which is surrounded by protective fences, in order to perform the necessary inspection and make the necessary decision. In the case of procedures which involve frequent alternation between work activities and observation or inspection activities, a solution of this type is unsatisfactory because of the frequent need to shut down the robot. Certain simple manual tasks, furthermore, can turn out to be disproportionately complicated from an engineering standpoint for a fully automated or even for a remote-controlled manipulator, or they can be characterized by an unfavorable cost-to-benefit ratio in the sense that, for the robot to perform an activity which would be simple for a human being, the robot system would have to be equipped with a highly complex system of sensors. The simple removal of a small safety element such as a cotter pin is easy for a human being, because he can determine the location of the cotter pin visually and pull it out easily by hand. For a robot to perform the same task, it would have to be equipped with a complicated system of sensors to make it possible to detect the position of the element, in this case the cotter pin. Only then will the robot be able to remove the cotter pin. Even if this is to be done by means of a remote manipulator, for example, the activity is still complicated, unreliable, and slow.

One way of reducing the severity of this problem is to adapt the workplace in question and the associated working equipment to the needs of automation. WO 2008/025562 A1, for example, proposes a concrete implementation according to which a robot can replace the slide gate mechanism of a steel ladle. The disadvantage of this system is that the effort required to undertake such an adaptation leads to considerable cost, and as a result the economic efficiency of a plant equipped in this way is decreased because of the associated investment costs. In the case of the example described in WO 2008/025562 Al, each casting ladle must be equipped with a corresponding slide gate system and the associated mounting device.

Another significant disadvantage of the known systems is that use can under certain conditions interfere with the accessibility of the installation in question. Whereas, in the case of manipulators, safety is ensured by the responsible operation by the human workers, that is, by the operating personnel in question, the law (in Europe, for example, Guideline 2006/42/EU) dictates that, in the case of conventional, fully automated industrial robots, the area in which the robot works and moves must be kept separate from the area where human beings, i.e., the operating personnel, work.

Finally, it is known from WO 2007/057061 A1 that the active work robot can be pivoted out of the actual work area, so that the operating personnel can gain access to the work area. Pivoting the robot out of the way, however, requires a certain amount of time, so that, when danger threatens, it is possible for valuable time to pass before the operating personnel can enter the hazardous area and counteract the threat of danger.

The invention is based on the goal of creating a solution which allows a more flexible adaptation of a robot or of a robot system to different degrees of human-robot interaction.

SUMMARY OF THE INVENTION

This goal is achieved according to the invention by a robot interaction system comprising a robot with a robot control unit provided with various types and modes of operation which influence the assigned human-robot interface, these types and modes of operation being designed to be adapted and/or adaptable to different degrees of automation of the robot and/or to different positionings of the interacting human and robot partners in time and space in the work area.

The invention therefore provides a flexible solution for the design of a robot system and of the area where it moves and works, and a working method is created according to which tasks can be executed with various divisions of labor and with various divisions of the task with respect to time and space in interaction with the human operating personnel, so that several tasks can be performed quickly and efficiently without being limited or restricted by a fully automated or remote-controlled design of the robot system. According to the invention, therefore, the goal is achieved that the possibilities of modern industrial robots can be combined with human perception and decision-making ability. For this purpose, a robot system which can be adapted flexibly to several different activities within the work environment in question is assigned to each workplace, especially in metallurgical or rolling technical equipment or plants. The flexibility of the robot system is achieved in that the system comprises various operating modes, which allow different forms of cooperation between a human worker or the operating personnel and the robotic system, and which comprise an expanded number of types of operation. The robot control unit is expanded correspondingly to include these additional operating modes. For this purpose, different forms of interaction are introduced into the robotic system so that the labor required to perform a task can be divided between the interacting robot and the human partners in the form of workers or operating personnel and also so that the labor can be divided in various ways with respect to time and space. The various forms of interaction define levels of temporal and spatial separation between the interacting robot and its working partners within the area where the robot system works and moves. For example, it would be possible for a worker and a robot to cooperate directly by executing an activity jointly on the same workpiece without temporal or spatial separation—a form of interaction which is generally referred to as "collaboration". This form of interaction also includes the process of direct observation, in which the robot executes a task independently as it is being observed by the human being present in the sphere of movement of the robot. According to another type of interaction, the robot works by itself while being under the remote control of a human being located a safe distance away. In this case, there is then a spatial and temporal separation of the interacting partners in the work area.

The robot interaction system is characterized by several different types of robot operation, which include not only the otherwise conventional (fully) automated type of operation but also preferably new and additional types of operation to the robot interaction system and the robot control unit, these new types of operation allowing stronger degrees of interaction with the operating personnel or the worker.

One such new type of operation is the manipulation type, in which the robot is in the state of so-called manual operation. During the manipulation type of operation, the robot is operated by way of a manual controller, which gives the employee/worker direct control over the axes and/or Cartesian control over the end effectors. In this manipulation type of operation, three different modes with different functionalities are distinguished. These are differentiated on the basis of the distance between the robot and the human operating personnel.

In the first mode, the robot is operated as a manually guided robot. In this mode, the human operator can guide the robot directly with his hands. This is achieved by means of force-moment sensors, which are mounted on the robot and which measure the pressure which the worker in question exerts on the robot, preferably on the end effector or on the part of the robot which is to be moved.

Another mode consists in the guidance of the robot by means of a manual controller. In this mode, the worker in question stands next to the robot, specifically within the sphere of movement of the robot, and actuates the robot by way of a controller, which is designed as a control console in the form of a control stick or a combination of control sticks or as a "spacemouse".

Another mode pertains to the remote-controlled guidance of the robot by means of a manual controller, in which the human operator and/or worker stands outside the sphere of movement and activity of the robot, such as in a control room, and observes the robot from a distance or through cameras, wherein the manual controller can be designed in the same way as for the second mode described above. In the manipulation type of operation, the operator/worker has the ability to control the axes and/or directly to control the gripper/tool on the robot in question.

Another type of robot operation is semi-automatic operation, in which the robot automatically carries out the sequences of a robot program. In this semi-automatic type of operation, the robot makes a series of programmed sequences available to the operator, each sequence corresponding to one of the partial work steps of the task at hand which is assigned to the robot and the robot interaction system. The operator can select individual work sequences and stop or start them whenever desired. In this type of operation, individual work steps are carried out essentially in alternation between the robot and its human operator. For example, the worker opens a hatch, steps aside, and then starts a short sequence in the robot control unit, as a result of which the robot inserts a heavy object into the opening. At the end of the automatically executed sequence, the human worker can then close the hatch again. Starting, stopping, and selecting sequences can be accomplished by way of an easy-to-operate input device, a voice-activated controller, or by way of the gestures of the worker/operator, which are detected by appropriate sensors. Semi-automatic operation also makes it possible for the operator to intervene in a fully automated program sequence in the event that this sequence encounters a problem for unforeseen reasons or when something unusual is observed during the course of the automatically controlled work. The operator can in this case interrupt the fully automated operating sequence and change over to semi-automatic operation, which allows him to repeat individual sequences or to jump to a different work step within the program. The functions available in semi-automatic operation include, for example, "pause", "move aside", "gripper open/close", "play" (=switch back to automatic operation), and "jump one step ahead/one step back". It is also possible to switch at any time from semi-automatic operation to manipulation.

By way of elaboration, the invention provides that the various types and/or modes of operation can be turned on and off and that the robot can be adapted by means of these types and/or modes of operation to different functionalities and/or work activities.

Regardless of which type of operation is selected, it is guaranteed by the appropriate design of the robot interaction system that the necessary safety of the worker/employee is ensured at all times. A robot system and the assigned work area in question are set up in such a way that the different operating modes such as remote-controlled manipulation mode, collaboration mode, or fully automated mode, can be initiated in any desired sequence without complicated refitting or retrofitting.

The design is also conceived in such a way that the accessibility of the metallurgical or rolling plant equipped with an inventive robot interaction system remains preserved; escape routes are not blocked by grates in the event of sudden and dangerous incidents. This is achieved primarily in that the robot interaction system can be set up for the most part without the need for separating safety devices during the use of the inventive robot interaction system, which means that there are no interfering and/or separating grates in the way in the event that it is necessary for an operator or worker to enter the working space or work area of the robot. The mechanical safety of the metallurgical or rolling plant equipped with the inventive robot interaction system is realized not by barrier-type safety devices as described above but rather by sensor-based monitoring of the work area and by the use of safe controllers and/or a safety sensor system.

The previously described flexible and/or universal robot interaction system consists preferably of at least the following components: the robot, the safety sensor system, the safe controller, and the human-robot interface, which can be designed in the form of a manual controller or voice-activated controller.

The robot used in this robot interaction system is preferably a universal industrial robot, preferably a freely programmable one. Of course, the robot interaction system can also comprise more than one robot and thus can consist of two robots which cooperate with each other in the manner or a working robot and an assistant robot. The robot or robots preferably have six axes of movement, and their working or manipulating arm is equipped with a quick-change system for holding different types of tools, grippers, or measuring devices. The robot or the robots should preferably be designed for use in extreme working conditions, that is, in the high-temperature and/or hazardous area of the metallurgical or rolling plant. A model of this type is available commercially today under the designation "foundry-equipped". The grippers and tools will, of course, be selected accordingly.

In one of its embodiments, the invention is also characterized in that the robot interaction system is installed in a metallurgical or rolling plant, where it is assigned to a workplace or work area.

In a further embodiment, the invention provides, finally, that the robot interaction system comprises a safety sensor system comprising a sensor or a combination of sensors, which detects the presence of a human being in a safety area assigned to the robot work area and/or in the entrance area and/or in the detection area.

The safety sensor system preferably consists of a combination of various sensors, which are suitable for detecting the presence of human beings. The sensor system is designed in such a way that the presence of a human being, such as the entrance of a human being into the work area, is detected with a measure of certainty such that the overall system satisfies the requirements of the relevant legal regulations and guidelines such as Machinery Directive 2006/42/EC.

To achieve this, the safety sensor system comprises individual sensors; usually, however, a combination of sensors is used, wherein multiple and even redundant sensors can also be present. Suitable for use as sensors in the safety sensor system are, for example, laser scanners, light curtains, light barriers, cameras with depth detection, infrared cameras, ultrasound sensors, pressure mats, RFID (Radio Frequency Identification) chips, scanners, and force-moment sensors. Door contacts or switches, which allow a worker to indicate to the robot interaction system or to the safety sensor system that the work area has been entered, are also suitable elements for use in the safety sensor system. The elements of the safety sensor system such as the sensors used are selected, therefore, in such a way that they ensure that the environmental working conditions in the metallurgical or rolling plant remain appropriately safe for work in spite of the severe stresses caused by dust and heat. In the design of the safety sensor system, it is also necessary to take into account the decrease in reliability and service life resulting from the working environment such as can occur when optical sensors are used in areas with large amounts of dust. Another task of the safety sensor system consists in the monitoring of the assigned workplace or work area with respect to hazardous conditions, especially conditions of the installation which do not necessarily originate directly and primarily from the movements or activities of the robot but rather from the condition of the installation or the situation existing at the workplace. For example, temperature-detecting sensors are provided, which are suitable not only for detecting a human presence but also for recognizing hot surfaces or liquid steel, so that the danger can be identified in the case of a production accident or the failure of a piece of industrial equipment. By transmitting messages concerning potential hazardous locations, the system increases the safety of the operating personnel and workers in the work area in question even more. In addition, sensors for detecting toxic or harmful process gases, e.g., carbon monoxide, can also be integrated into the safety sensor system for monitoring ergonomy and/or occupational safety. The signals detected and/or processed by the safety sensor system are then sent to the robot control unit and/or to the assigned safety system, which then, as appropriate, triggers an alarm and/or shuts down the robot, for example, or, in the case of a mobile robot, moves it out of the hazardous area.

The truly essential element of the robot interaction system is the robot control unit, which makes possible the different forms of interaction between human and robot and which also guarantees that the human being is not endangered by the robot and in particular is not injured by it. The robot control unit is equipped with the following functional features and functionalities, which control and/or influence it: the robot control unit generates and/or monitors:

the safe limitation of the robot's speed. (Cartesian and axis-based);

the safe limitation of the sphere of movement by means of virtual walls, for example, that is, a safety area for the robot, which can change as a function of workplace and/or work activity;

the safe stopping of the robot's operation in any position; and safe brake ramp monitoring.

Another component of the robot interaction system is the human-robot interface, which allows various forms of interaction between human and machine/robot. In one form of interaction in which there is no temporal or spatial separation between the interacting partners, i.e., in which both interacting partners are located in the work area and/or safe area of the robot, the human-robot interface allows the worker to operate the robot system, to observe directly the condition of the installation from close up, preferably within the sphere of movement of the robot, and, if necessary, to intervene in the process, wherein the robot interaction system is equipped in this case in particular with an enable device operated by the operator, i.e., by the human worker, or an electromechanical enable switch. An "enable switch" is to be understood here as a switch device, which must be actuated continuously so that control signals for hazardous states can go into effect. Enable devices or electromagnetic enable switches can be designed as a universal 6D input device, such as a so-called space-mouse. It is also possible, however, to design it as a force-moment sensor mounted in the robot's hand or the robot's end effector; this sensor makes it possible for the robot to be guided intuitively without sacrificing the required safety. A design with built-in voice-activated control is also possible. This offers the additional advantage that the worker or operator in question can move around freely in the work space of the robot. In all embodiments, the enable device is an essential part of the control unit, as is also a visualization or visualized depiction of the next planned work step, which can be recognized and understood by the operator or worker in question, so that the worker will not be surprised by the next movements of the robot.

The following procedure is used to adapt the robot interaction system which has been described above and which will be described in greater detail below to the workplace or work area in question, i.e., to the workplace to which the robot comprising the robot interaction system is assigned, and to determine the modes and types of operation which will be required for the concrete task at hand. First, a detailed analysis of the work processes and individual activities taking place at the workplace in question or at the work area in question is prepared. The individual steps out of which the individual activities or work processes are composed and assembled are then evaluated individually to determine whether it is more suitable for a robot to perform the activity or for a human to do so. Activities which are ergonomically safe and also nonthreatening from a safety engineering standpoint are assigned to the human worker, whereas hazardous or difficult activities are assigned to the robot. Jobs which are not dangerous but require a large number of sensors, furthermore, are also assigned to the human worker. Another group of activities consists of those which represent a high potential for stress or a significant threat of danger and which therefore also require an inspection by a human worker and an evaluation based on that inspection. In this group, robot and human work in direct interaction with each other in the same part of the work area or workplace of the robot.

The individual assignments can be easily . . . in the operating mode in question, so that several modes or types of operation, which comprise forms of interaction and the types of interaction derived from them, can be filed in the robot control unit or stored and displayed in a memory unit cooperating with the control unit, so that the robot interaction system has access to it. The implementation of the individual human-robot interactions in a certain mode or type of operation constitutes in each case the sequence according to which the human-robot team jointly solves the work problem with which they are confronted, wherein purely robotic activities can be performed in the absence of the human worker. This allows the robot to work at higher speed, because the safety control system does not have to take any account of the presence of operating personnel in the work area and/or safety area of the robot. Similarly, the robot can then be shut down when a human activity, to be performed by the operating personnel or worker, is to be conducted at a given point over a certain period of time.

The operating modes, furthermore, are designed with a degree of flexibility sufficient to allow the operator of the robot or of the robot interaction system in question to intervene in the given, programmed work sequence at any time and to perform manual actions in cases where, for unforeseen reasons and depending on the individual case, the continuation of the programmed fully or partially automated solution appears inappropriate from the operator's standpoint.

It is also possible to connect the robot interaction system to a higher-level process management system, which is assigned to the metallurgical or rolling plant, so that the current operating mode of the robot in question, especially the industrial robot, the progress of the activity to be performed at the workplace or work area of the robot in question, and/or the detection results supplied by the sensors installed on the individual robot in question or in the environment of the robot can be transmitted in the form of signals and thus reported to the higher-level process management system.

Overall, with the help of the robot interaction system, a system is created which makes it possible to deploy a robot universally, not only for a single type of operation or in "fully automated" mode but also in types or modes of operation in which an interaction between human/worker/operator and robot takes place, wherein the human and the robot are temporally and spatially together in the area where the robot works and moves, or wherein robot and human are in spatially separate locations and possibly also are present or actively working at separate, i.e., different, times and nevertheless cooperate interactively with each other to accomplish a common task. This contrasts with the previous prior art, according to which either the robots are programmed for specific activities and there is also a temporal and a spatial separation between robot activities and human activities in the metallurgical or rolling plant. In known metallurgical plants, there is no simultaneous interaction between robots and humans according to the current prior art. As soon as a human enters the work area of the robot, the robot is shut down. After that, the human can perform his inspection or maintenance activity. Then the human leaves the area where the robot works or moves again, before the robot is reactivated.

In contrast, the inventive robot interaction system makes it possible for human and robot to interact with each other in the industrial task to be performed without temporal and/or without spatial separation. For example, it is possible for both agents, that is, the human and the robot, to execute different manipulations or activities simultaneously in the same work area, especially in the work area of the robot, so that there is no temporal separation between the robot's activity and the human activity. It is also possible for an interaction to be performed in the area where the robot works or moves in that, for example, the human performs a first activity and the robot then accepts the results of that activity and continues with another step of the process. In this sense, there is then no spatial separation between the human activity and the robot's activity. A further possibility consists in the complete elimination of any spatial or temporal separation; this would be present, for example, when, in the area where the robot moves or works, the human and the robot work hand-in-hand, so to speak, that is, when, for example, the human passes a workpiece to the robot, and the robot grips the workpiece and subjects it further processing. With the help of this flexible robot interaction system, it is possible to increase the number of possible ways in which robots can be deployed in the area of industrial steelmaking, casting, or rolling mill facilities. This leads to an increase in occupational safety, to an improvement in the ergonomic situation for the workers/operators, and also to improved quality. This is achieved with the help of the robot interaction system, which makes the robot equipped with it into a flexible automation system for managing a wide variety of forms of interaction between human and robot, and which makes it possible to divide the labor of tasks, procedures and processes between human and robot in both time and space. With the help of the robot interaction system, the robot is equipped with a large number of possible functions, types of operation, and operating modes, so that, in a manner comparable to a so-called Swiss Army knife, it is able to perform not only the basic function of an automated handling task or work process analogous to the cutting function of a knife but also comprises, like the Swiss Army knife, additional tools in the form of various types or modes of operation. A flexible or universal robot interaction system of this type comprises at least the following components: a robot; a safety sensor system with functions for detecting the presence of humans and for monitoring the workplace for hazardous conditions; a robot control unit; and a human-robot interface in the form of, for example, a manual controller or a voice-activated controller. The flexibility of the robot interaction system is achieved in that the system comprises various types and/or modes of operation, each of which visualizes and allows different forms of cooperation and interaction between a human worker and the robot, and also an increased number of different types of operation. The various types and/or modes of operation are either stored directly in the robot's control unit or stored in memory units cooperating with the robot's control unit.

To provide the system with an extra measure of flexibility, it is possible to mount the robot movably on tracks, where these tracks can also be designed in the form of crane tracks. This makes it possible to achieve a further increase in the sphere of movement and in the associated possible deployments of the robot equipped with the robot interaction system.

This aim is supported further in that, as a function of the task which the robot is intended to perform, dynamically changing safety areas or safety spaces are assigned to it, which are or can be laid out in relation to the robot's specific workplace or to the robot's specific activities.

Because, within the scope of the invention, the cooperation between human and robot, that is, the human-robot interaction, is envisioned, the individual robot in question can be equipped with different, scalable degrees of automation designed to suit its particular purpose. The scalability extends in this case from a robot which is controlled almost completely by the human worker, which represents the one endpoint of the scalable automation, to a robot which performs its tasks without any human control at all, which represents the opposite end of the automation scale. As the degree of automation increases, so does the degree of mechanization/automation of the robot, whereas the amount of human effort required to operate the robot decreases simultaneously. The stages of scalable automation can consist at the lower end, for example, of a remote-controlled robot, which is operated as a purely remote-controlled manipulator by the operator/worker. The next stage is the combination of the remote-controlled robot, which performs remote-controlled operations, with manual work steps, which a worker performs without handling devices. As the next stage, for example, a partially automated assistant or working robot independently performs certain partial tasks, and the worker performs certain manual work steps in interaction with the robot. The following stage can then consist of the combination of work steps performed under remote control by remote-controlled robot, partially automated work steps performed by a remote-controlled robot, and work steps performed manually by a worker. Here the robot will advisably be designed in such a way that, as a (freely) programmable industrial robot, it can be used for partially automated processes and also as a remote-controlled robot capable of operating in purely remote-controlled manipulation mode. The highest stage is the complete automation of all of the work activities to be performed in a metallurgical processing line or a metallurgical or rolling plant, activities which in the past, for example, had to be performed by workers. Different robots can also cooperate with each other in fully automated fashion, so that an assistant or working robot can execute work activities in combination with a service robot.

It is also possible to equip the industrial robot in question in a scalable manner with the "machine intelligence" required for the individual task at hand. The degree of "machine intelligence" is determined by the sensory capacities with which the robot in question, in particular the industrial robot, is equipped. Whereas an industrial robot without sensory capacities is "blind" and thus remains limited to tasks which take advantage only of the force and lifting power of the robot, a robot with sensors and the associated "machine intelligence" associated with them can, under certain conditions, accomplish significantly more work and perform more complex work activities. Although an increase in "machine intelligence" is also associated with an increasingly more complex control unit, this is accompanied by an increase in the number of possible work activities and thus of possible deployments. The stages of scalable "machine intelligence" start, for example, with exclusively coordinate-controlled, "blind" robots without sensors at the bottom end of the scale. The next stage could be an industrial robot equipped with a simple sensor system such as a light barrier, followed by a stage of an industrial robot with a simple sensor system capable of detecting the external environment, this robot being under at least partial human control and operation. The next stage could be a robot with a complicated sensor system such as a camera system; this robot would be able to detect the external environment, evaluate it, and take action as a function of the situation. The top stage would be a robot with a comprehensive, complex sensor system superior to that of a human being; this could be an industrial robot equipped with high-resolution cameras, such as thermal imaging cameras, for example. This robot would process the received signals in an assigned evaluation and control unit. This pertains in particular to so-called "autonomous" robots or cognitive robotic systems.

These industrial robots equipped with scalable "machine intelligence" and a scalable degree of automation are used in the area of steelmaking, casting, or rolling mill installations in combination with each other but also in combination with manual human activity in such a way that full justice is served to the fundamental ideas and fundamental concepts of ergonomy and occupational safety in the metallurgical processing line in question.

It is also possible for one or more safety areas to be assigned to each robot, which can be of different sizes and dimensions and dynamically variable in design depending on the robotic activity or on the working position of the robot. This idea, too, supports the fundamental concept of ergonomy and occupational safety in a metallurgical plant in the area of the individual pieces of metallurgical operating equipment.

So that, within the context of the human-robot interaction, activities can be handed over to, or continued by, the human worker outside the high-temperature and/or danger area of the installation in question, it is also possible for the industrial robot in question to be installed so that it can be moved around in the area of the metallurgical operating equipment or metallurgical or rolling mill, so that, as a result, the working area of the industrial robot can be made more flexible and increased in size and so that the safe transfer of activities or workpieces or the like to the worker outside the high-temperature and/or danger zone of the metallurgical operating equipment or the workplace or working area is ensured.

BRIEF DESCRIPTION OF THE DRAWING

The invention is explained in greater detail below by way of example on the basis of the drawing.

DETAILED DESCRIPTION OF THE INVENTION

Figure 1:
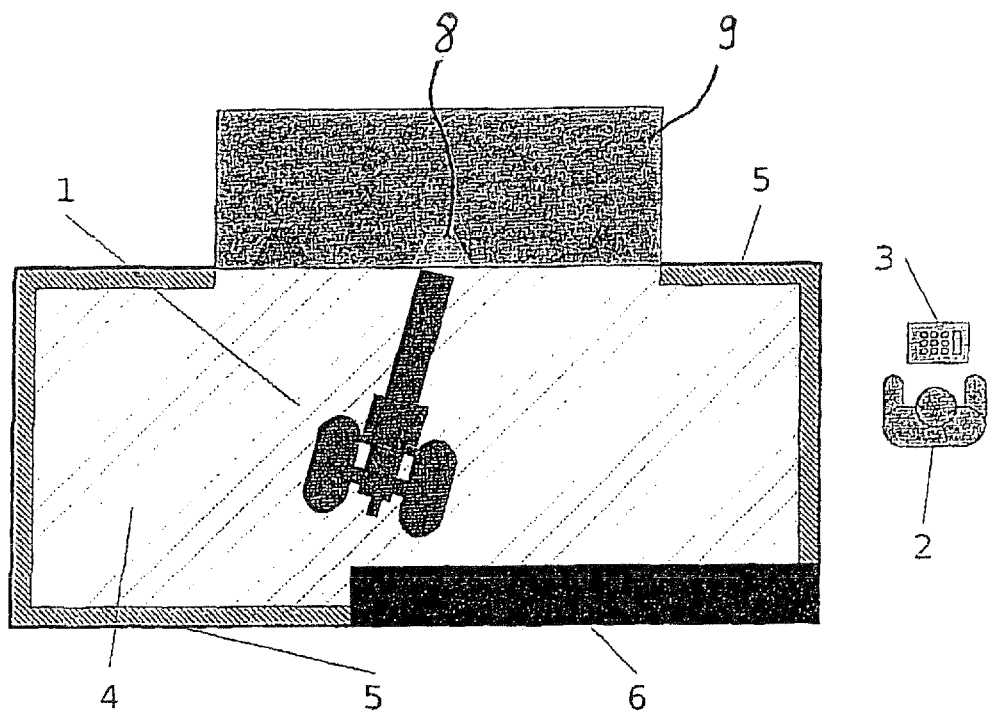
FIG. 1 shows a schematic diagram of a first form of interaction between robot and operator.
Figure 2:
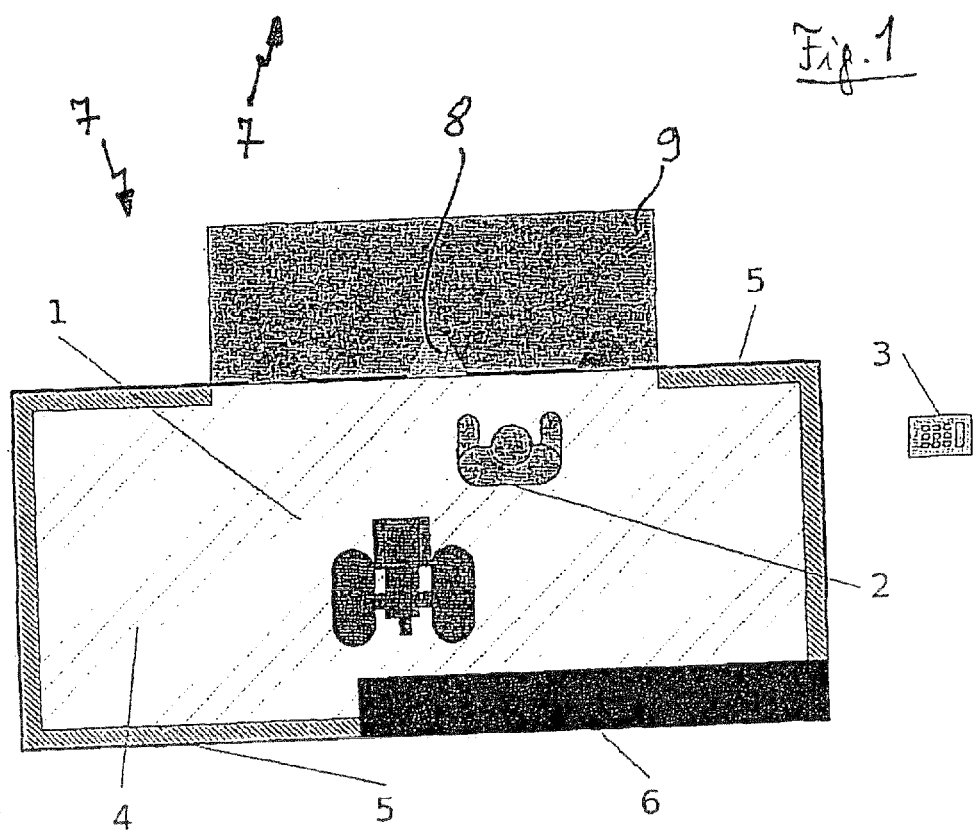
FIG. 2 shows a schematic diagram of a second form of interaction between robot and operator.
Figure 3:
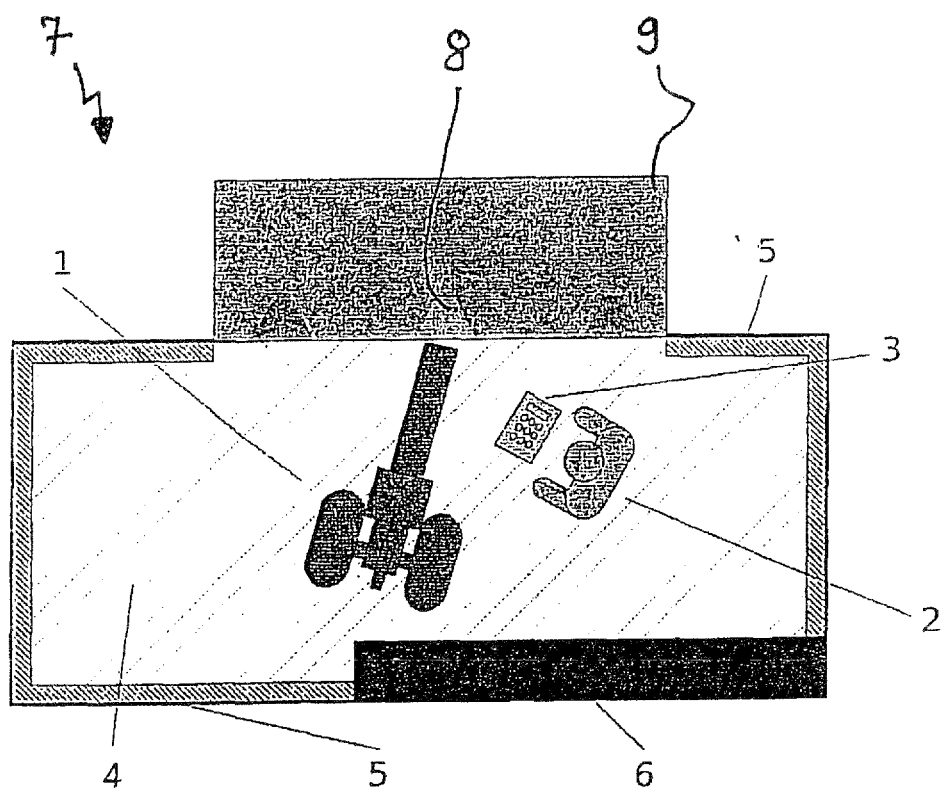
FIG. 3 shows a third form of interaction between robot and operator.

FIGS. 1-3 show the operating principles of a robot interaction system on the basis of the work activities which must be performed in the area of a ladle stand 7 of a metallurgical plant during the course of the inspection and maintenance of a ladle slide gate 8 on a steel ladle 9. FIG. 1 shows in schematic fashion the job of burning out the casting channel. FIG. 2 shows in schematic fashion the activity of opening the slide gate box; and FIG. 3 shows schematically the activity of inserting a new sliding plate.

The activities to be performed take place in an interaction between human/worker/operator 2 and the robot 1. The robot 1 is equipped with a robot control unit, which comprises an assigned human-robot interface, which together form a component of a robot interaction system, which comprises types and modes of operation which influence the human-robot interface. These different types and modes of operation are designed to be adapted and/or adaptable to different degrees of automation of the robot and/or to different temporal and/or spatial positionings of the interacting human 2 and robot 1 partners in the work space.

A monitored safety area 4, furthermore, is assigned to the robot 1, the boundaries of which are formed by two monitored entrance areas 5, a wall section 6, and the area of the steel ladle 9 to be worked on. Both the safety area 4 and the monitored entrance areas 5 are . . . by sensors, which forms safety sensor systems and which respond in particular when a worker or operator 2 enters the safety area 4, thus initiating, via the robot control unit, appropriate actions by the robot as a function of the selected working mode and as a function of the type of active robot operation. These actions can consist in that the robot 1 enters into an interaction with the entering worker or operator 2, in that the robot 1 slows down its working speed, in that the robot 1 is shut down, and/or in that the robot 1 is moved back into a rest position. Other actions can also be triggered by the safety sensor systems.

FIG. 1 shows a first form of human-robot interaction, in which a spatial and a temporal separation is present between the two components, i.e., between the human 2 and the robot 1. Here the robot interaction system is in a fully automated operating mode or in a remote-controlled manipulation mode, wherein, in the latter cases, the operator 2 controls the robot 1 manually by use of an operator console 3. For the job of burning out the casting duct shown in FIG. 1, the robot 1 performs this burning-out activity, because the associated potential for danger means that this activity must be assigned to the robot 1. The robot 1 burns out the casting duct completely by itself, in the absence of the operator 2, that is, while the operator 2 is outside the monitored safety area 4. There are exceptions in which it is conceivable that the casting duct could be burned out by remote-controlled manipulation. In this case, the operator 2, who remains positioned outside the safety area 4, controls the robot 1 by using an operating console 3. Because, in this form of worker/operator 2 interaction, the worker remains outside the area in which the robot 1 moves and works—and thus outside the safety area 4, the control unit, especially in the form of the previously mentioned safe control unit or safety controller, can move the robot 1 at full working speed. This continues until the sensor safety system or the safety sensors assigned to it which monitor the safety area 4 and/or the entrance area 5 determine the presence of a human worker. If a human being, such as a worker 2, enters the monitored safety area 4 or walks through the monitored entrance area 5, there is sufficient time for the robot 1 to stop the burning process initiated by the robot control unit and to shut itself down or terminate the current work process.

As the second form of interaction, FIG. 2 shows the temporal separation between the robot 1 and the worker/operator 2, wherein a spatial separation is not present, because both the robot 1 and the worker/operator 2 are present in the monitored safety area 4. In this position, the robot 1 will preferably operate in semi-automated mode. The process of opening a slide gate box is performed with this positioning. This work activity is neither ergonomically stressful nor hazardous to the operator 2, while at the same time the amount of effort required to equip a robot 1 with sensors in such a way that it could perform this job in fully automated fashion is extremely large. In accordance with the philosophy on which the robot interaction system is based and which has been explained above, therefore, an operating mode is selected for this work activity in which the operator or worker 2 performs the activity, while the robot 1 remains safely shut down.

As the third form of interaction, FIG. 3 shows the cooperation of robot 1 and operator 2 in the same time and space, which means that there is neither any spatial nor any temporal separation between the robot 1 and the operator 2. In this form of interaction, according to the present exemplary embodiment, the operating mode "semi-automated" or "manual" operation is used, by means of which the work activity of inserting a new sliding plate into the bottom of a steel ladle 9 is performed. Because a sliding plate is quite heavy, this process of inserting a new sliding plate would be problematic from an ergonomic standpoint for a human operator 2. At the same time, the insertion of the sliding plate into the bottom of the steel ladle demands that the local conditions be determined precisely. On the basis of these boundary conditions, a human-robot interaction is carried out in this case by means of the robot interaction system in such a way that the robot 1, while the worker 2 remains within the sphere of the robot's movement, transports the sliding plate to a point directly adjacent to the steel ladle 9, whereupon the operator 2, exercising manual control by the use of his operating console 3, controls the robot 1 so that it, under the control of the operator 2, inserts the sliding plate in the slide gate box at the bottom of the steel ladle 9 to complete this work activity or this work process.

The invention claimed is:

1. A robot system, comprising
    at least one robot located in a metallurgical or rolling plant and assigned there to a work area of a worker for interaction with the worker;
    a robot control unit with various operating modes for controlling the robot, where the operating modes allow different forms of interaction between the worker and the robot and various types of operation for the robot, wherein the forms of interaction permit tasks to be executed with various divisions of labor and with divisions of the task in various ways with respect to time and space, wherein types of operation represent different degrees of automation of the robot and are designed to be adapted to hazardous or difficult activities in the work area; and
    a human-robot interface assigned to the robot control unit for flexible adaptation of the robot to different functionalities and/or work activities by turning on or off one of several available modes and/or types of operation by the worker.

2. The robot system according to claim 1, wherein the human-robot interface is a manual controller.

3. The robot system according to claim 1, wherein the human-robot interface is a speech-activated controller.

4. The robot system according to claim 1, further comprising a safety sensor system having a sensor or a combination of sensors, which system sensor detects presence of a human being in a safety area assigned to the robot work area and/or an entrance area and/or a detection area.

5. The robot system according to claim 4, wherein the safety sensor system is also operative to monitor the robot work area or the workplace of the worker with respect to hazardous conditions, which originate not primarily from the movements or activities of the robot but rather from conditions of the plant or a situation at the workplace.

6. The robot system according to claim 4, wherein The safety sensor system is operative to generate messages concerning potential hazard sites.

7. The robot system according to claim 1, wherein the types of operation of the robot also comprise operation of a manipulation type.

8. A method for operating a robot system with a robot in a metallurgical or rolling plant, wherein the robot can be operated in various operating modes, which comprise different forms of interaction between a worker and the robot and various types of operation, wherein the forms of the interaction make it possible to execute tasks with various divisions of labor and with division of the task in various ways with respect to, time and space, and wherein the different types of operation represent different degrees of automation of the robot and are adapted to hazardous or difficult activities in a work area of the plant, the method comprising the step of:

flexibly adapting the robot to different functionalities and/or work activities in interaction with a worker by turning on or off one of the several available types and/or modes of operation by the worker.

9. The method according to claim 8, wherein the worker turns the types and/or modes of operation on or off by means of a manual controller.

10. The method according to claim 8, wherein the worker turns the types and/or modes of operation on or off by means of a speech-activated controller.

11. The method according to claim 8, including detecting presence of a human being in a safety area assigned to the robot work area and/or in an entrance area and/or in a detection area.

12. The method according to claim 8, including monitoring the robot work area or the worker's workplace with respect to hazardous conditions which originate not primarily from movements or activities of the robots but rather from the condition of the plant or the situation at the workplace.

13. The method according to claim 8, wherein the worker can also select manipulation as the type of operation for the robot.

14. A method for defining a type or mode of robot operation required for each concrete work activity in a metallurgical or rolling plant, comprising the steps of:

evaluating in detail individual activities taking place in a work area;

defining individual steps that compose the individual activities;

evaluating the individual steps according to whether they are safe from an ergonomic and safety engineering standpoint or whether they are hazardous or difficult to perform;

assigning the individual steps which are safe from an ergonomic and safety engineering standpoint to a worker and assigning the hazardous activities and those which are difficult to perform to the robot;

displaying the individual assignments present in the mode and/or type of robotic operation in question; and storing the types and modes of operation in a robot control unit or in a memory unit assigned to the robot control unit.

* * * * *

UNITED STATES PATENT AND TRADEMARK OFFICE
CERTIFICATE OF CORRECTION

PATENT NO. : 8,700,197 B2  Page 1 of 1
APPLICATION NO. : 13/126893
DATED : April 15, 2014
INVENTOR(S) : Plociennik et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 550 days.

Signed and Sealed this

Twenty-ninth Day of September, 2015

Michelle K. Lee
*Director of the United States Patent and Trademark Office*